US010683808B2

(12) United States Patent
Bogue et al.

(10) Patent No.: US 10,683,808 B2
(45) Date of Patent: Jun. 16, 2020

(54) SLIDING CONTACT WEAR SURFACES COATED WITH PTFE/ALUMINUM OXIDE THERMAL SPRAY COATING

(71) Applicant: UNITED TECHNOLOGIES CORPORATION, Farmington, CT (US)

(72) Inventors: William Bogue, Hebron, CT (US); Timothy J. Tabor, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 801 days.

(21) Appl. No.: 14/758,742

(22) PCT Filed: Nov. 6, 2013

(86) PCT No.: PCT/US2013/068708
§ 371 (c)(1),
(2) Date: Jun. 30, 2015

(87) PCT Pub. No.: WO2014/133602
PCT Pub. Date: Sep. 4, 2014

(65) Prior Publication Data
US 2015/0369133 A1   Dec. 24, 2015

Related U.S. Application Data

(60) Provisional application No. 61/769,587, filed on Feb. 26, 2013.

(51) Int. Cl.
*F02C 9/18* (2006.01)
*C23C 4/04* (2006.01)
(Continued)

(52) U.S. Cl.
CPC .............. *F02C 9/18* (2013.01); *C23C 4/04* (2013.01); *C23C 4/11* (2016.01); *C23C 24/04* (2013.01);
(Continued)

(58) Field of Classification Search
CPC ........ F02C 9/138; F04D 27/0215; C23C 4/04; C23C 4/11; C23C 24/04
See application file for complete search history.

(56) References Cited

U.S. PATENT DOCUMENTS 5,885,663 A   3/1999 Longo
6,418,709 B1   7/2002 Narcus et al.
(Continued)

OTHER PUBLICATIONS

Ceramic fluropolymer composite coatings by thermal spraying, Mateus et al., 2004.*
(Continued)

*Primary Examiner* — Woody A Lee, Jr.
(74) *Attorney, Agent, or Firm* — Cantor Colburn LLP

(57) ABSTRACT

A method of applying a wear-resistant coating to aluminum sliding contact wear surfaces is disclosed. The method includes providing a plurality of parts having sliding contact wear surfaces and thermal spray coating at least one of a composite aluminum oxide and PTFE or a blend of aluminum oxide and PTFE. The disclosed method may be used to repair aluminum parts subject to sliding contact wear as well as in the design of new aluminum parts subject to sliding contact wear. Improved compressor bleed valves for gas turbine engines and improved fan exit case assemblies are also disclosed.

19 Claims, 4 Drawing Sheets

(51) Int. Cl.
  F04D 27/02 (2006.01)
  C23C 4/11 (2016.01)
  C23C 24/04 (2006.01)
(52) U.S. Cl.
  CPC ....... *F04D 27/023* (2013.01); *F04D 27/0215* (2013.01); *F05D 2300/2112* (2013.01); *F05D 2300/432* (2013.01); *F05D 2300/603* (2013.01)

(56) References Cited

U.S. PATENT DOCUMENTS

| | | | |
|---|---|---|---|
| 2003/0180565 A1 | 9/2003 | Herbst-Dederichs | |
| 2004/0096315 A1* | 5/2004 | Chlus | F01D 17/141 415/145 |
| 2006/0228541 A1 | 10/2006 | Yasui et al. | |
| 2007/0099014 A1 | 5/2007 | McCullough et al. | |
| 2007/0234738 A1 | 10/2007 | Borcea | |
| 2008/0145554 A1 | 6/2008 | Ghasripoor et al. | |
| 2008/0187754 A1 | 8/2008 | Longo et al. | |
| 2013/0108413 A1* | 5/2013 | Suciu | F01D 11/006 415/115 |

OTHER PUBLICATIONS

International Search Report for related PCT Application No. PCT/2013/068708; dated Aug. 27, 2014.
Extended European Search Report; Application No. 13876138.2; dated Sep. 19, 2016; 9 Pages.
Mateus C. et al, "Ceramic/Fluoropolymer Composite Coatings by Thermal Spraying—A Modification of Surface Properties"; Surface and Coatings Technology; Elsevier; vol. 191, No. 1; Jul. 22, 2004; (Jul. 22, 2004); pp. 108-118; XP027608489; ISSN: 0257-8972.

\* cited by examiner

SLIDING CONTACT WEAR SURFACES COATED WITH PTFE/ALUMINUM OXIDE THERMAL SPRAY COATING

CROSS-REFERENCE TO RELATED APPLICATION

This application is a US National Stage under 35 USC § 371 of International Patent Application No. PCT/US13/68708 filed on Nov. 6, 2013, and claims priority under 35 USC § 119(e) to U.S. Provisional Patent Application Ser. No. 61/769,587 filed on Feb. 26, 2013.

TECHNICAL FIELD

This disclosure relates to the field of manufacturing and repairing aluminum gas turbine components that experience sliding contact wear and, more particularly, this disclosure relates to methods that extend component life by reducing sliding contact wear damage which could cause the component to be scrapped. This disclosure also relates to improved fan exit cases and compressor bleed valves for gas turbine engines.

BACKGROUND

Gas turbine engine components, such as fan cases and bleed valves are typically constructed of aluminum and magnesium alloys. Aluminum alloys such as AA 6061 and AA 2024 are soft and suffer damage via general wear, especially when two components are in sliding contact with each other. One method of mitigating wear of aluminum alloys is an anodic conversion of the alloy to produce a hard oxide layer on the exposed surface via processes such as AMS 2469. Hard anodic coatings generally provide superior wear resistance then other methods of restoring aluminum alloy components dimensionally.

However, hard anodizing processes have drawbacks. Hard anodizing processes consume part of the surface of the components. The hard anodizing process adds thickness to the surface, but the interface between anodized surface and parent alloy moves in to the parent alloy. A rework or repair of the anodic layer requires that all prior layers be removed and therefore removal of an anodic layer also involves removal of some of the original material of the component, thereby altering the original dimensions of the component. As a result, the number of times a hard anodized layer may be applied in the rework and repair of the component is limited. Often, plating or welding of the component surface to restore the original dimensions is required, which is costly and time-consuming.

As an improvement to hard anodic coatings like AMS 2468, polytetrafluoroethylene (PTFE) has been added to provide a different coating, such as AMS 2482, which provides improved performance for sliding contact surfaces.

In a gas turbine engine, bleed valves are but one example of components that include sliding contact surfaces that are prone to wear. Another example can be found in the slots formed at the aft and of a fan exit case that are used to couple the fan exit case to the cowl doors that form part of the nacelle that encloses the engine.

With respect to bleed valves, compressors of gas turbine engines are designed to operate at one optimum speed. Each rotating compressor blade and each stationary stator vane are made to operate most efficiently at a certain airflow and pressure. If the engine operates at any speed less than, or greater than this "design" speed, the efficiency of the compressor decreases. At very low speeds, such as starting, and idling, a compressor is operating outside of its efficient running zone. At higher compressor compression ratios, the engine becomes more efficient. Therefore, at a low speed operation of a gas turbine engine, typically encountered when starting or idling, the compressor discharge pressure can literally turn around and exit out the front of the engine, or "stall". A stall can be severe, and can lead to the engine stopping or being damaged. At these low speeds, the front stages of the compressor pull in more air than the higher pressure stages can handle. As a result, the high flow rate "chokes" in the higher stages, pressure builds up in the middle of the compressor, and the slow moving front stages cannot hold the pressurized air back any longer. The air then simply reverses, and blows out the inlet duct.

To remedy this problem, engine designers add one or more bleed valves on the compressor case. The bleed valves allow this extra air being brought into the engine by the front stages to be blown into a bypass flow path, thus keeping the airflow in these stages high, the air pressure low, thereby enabling the higher stages of the compressor to handle the reduced airflow and lower pressures efficiently. Once the engine speeds up, the bleed valves will close to keep the compressor operating within its efficient zone, until reaching full speed, where all bleed valves are closed, and the compressor reaches or approaches its peak efficiency.

Typical bleed valves include a valve element selectively movable to an open position where it provides communication between bypass flow path and the primary flow path, such that some of the air from the primary flow path can be directed to the bypass flow path. The valve element and the various sliding contact surfaces it engages are prone to wear. Another example of gas turbine engine services subject to sliding wear are the slots that form part of the connection between a fan exit case and the cowl doors that form part of the nacelle.

To combat the effects of wear and prolong the life of bleed valves or other sliding contact where surfaces, special coatings are applied. One such coating, AMS 2482 is a hard aluminum oxide coating, impregnated or co-deposited with polytetrafluoroethylene (PTFE). However, when the layer or coating of AMS 2482 is worn away, the AMS 2482 typically cannot be replaced without plating or welding the surface of the part to restore the original dimensions, which is time consuming and costly.

Thus, improved coatings and improved sliding contact surfaces are needed to reduce maintenance and parts costs.

SUMMARY

In one aspect, a method of applying a wear-resistant coating to sliding contact wear surfaces is disclosed. The method may include providing a plurality of parts having sliding contact wear surfaces and thermal spray coating at least one of a composite of aluminum oxide and polytetrafluoroethylene (PTFE) or a blend of aluminum oxide and PTFE that is suitable for application using a thermal spray technique, which enables the disclosed coating to be applied in a thickness of up five time thicker than conventional coatings applied using an anodizing process.

In another aspect, a compressor bleed valve for a gas turbine engine is disclosed. The compressor bleed valve may include a stationary segment coupled to a partially rotational bleed valve duct. The bleed valve duct may be rotational between open and closed positions. The bleed valve duct may include a plurality of passageways wherein each passageway may include an inlet facing radially inwardly and an outlet facing radially outwardly of the gas turbine engine. Each outlet of each passageway may be coated with at least one of a composite of aluminum oxide and PTFE or a blend of aluminum oxide and PTFE.

In another aspect, a compressor bleed valve for a gas turbine engine is disclosed that may include a static valve body that houses a piston operatively connected to an actuator by a rod extending through the valve body. At least one of the piston, rod and portions of the valve body which are engaged by the piston may be coated with at least one of a composite of aluminum oxide and PTFE or a blend of aluminum oxide and PTFE.

In another aspect, a fan exit case for a gas turbine engine is disclosed that includes slots disposed at its aft end for connecting the fan exit case to a bleed valve or another case segment. The slots may be coated with a composite of aluminum oxide and PTFE or a blend of aluminum oxide and PTFE.

DESCRIPTION

Figure 1:
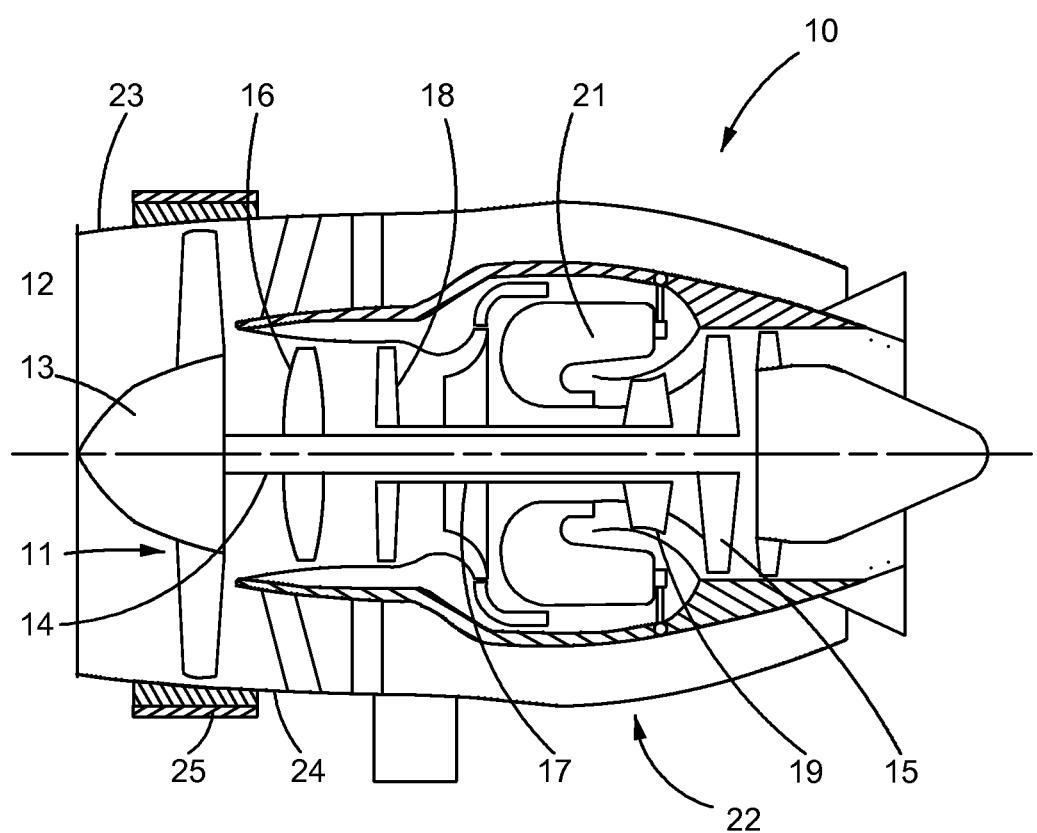
FIG. 1 is a sectional view of a gas turbine engine in which the disclosed repair methods, improved bleed valves and improved fan exit case may be employed.

FIG. 1 illustrates a gas turbine engine 10 on which the improved methods of manufacturing and repairing components may be carried out and in which the disclosed improved components may be employed. The disclosed coatings require few repairs or longer operating times between re-coatings because the disclosed coatings are thicker than conventional coatings, such as AMS 2482. Further, the disclosed coatings provide reduced wear of mating rubber seals that slide over the disclosed coatings. Specifically, wear into the aluminum typically occurs when the seal wears out and the alloy to which the seal is attached grinds into the aluminum. Prolonging the seal life improves the durability of the system.

The forward end of the engine 10 may include a fan 11 that may include a plurality of fan blades 12 coupled to a rotor 13. The fan 11 may be coupled to an inner drive shaft 14 that extends through the engine 10 before being coupled to a low pressure turbine (LPT) 15. The inner shaft 14 is also coupled to a low pressure compressor (LPC) 16 shown schematically in FIG. 1 so the LPC 16 may be driven by the LPT 15. The inner drive shaft 14 passes through an outer drive shaft 17. The outer drive shaft 17 is coupled to a high pressure compressor (HPC) 18 which is coupled via the outer drive shaft 17 to a high pressure turbine (HPT) 19. The HPT 19 drives the HPC 18 via the outer shaft 17. A combustor 21 is disposed between the compressors 16, 18 and turbines 19, 15 thereby enabling the turbines 19, 15 to drive the compressors 18, 16 respectively.

Also shown in FIG. 1 are two housings or cases. First, FIG. 1 shows the nacelle 22 which includes a plurality of components, only some of which need to be described here. For example, the nacelle 22 includes an inlet nose cowl 23 and a pair of fan cowl doors, only one of which is shown at 24 in FIG. 1. The inlet nose cowl 23 provides optimum air flow to the fan while the fan cowl doors 24 provide access to the fan case in various other components. Also shown in FIG. 1 is a fan exit case assembly 25 shown in FIG. 2.

Figure 2:
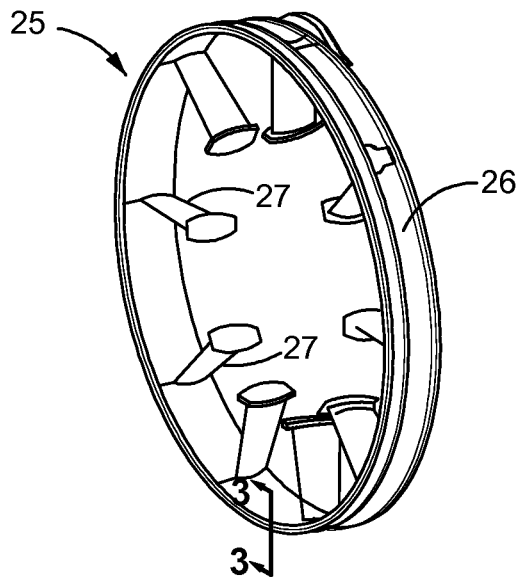
FIG. 2 is a perspective view of an improved fan exit case assembly made in accordance with this disclosure.
Figure 3:
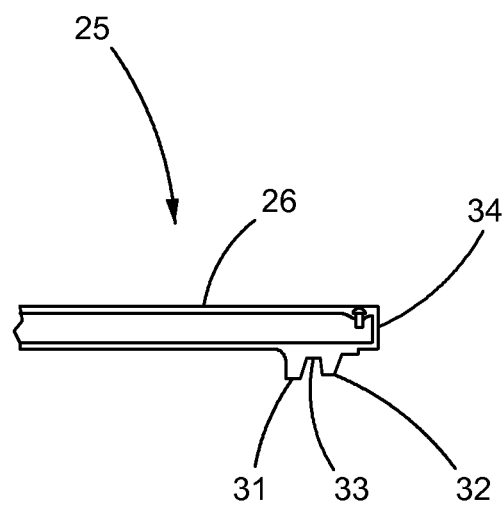
FIG. 3 is a partial sectional view taken substantially along line 3-3 of FIG. 2.
Figure 4:
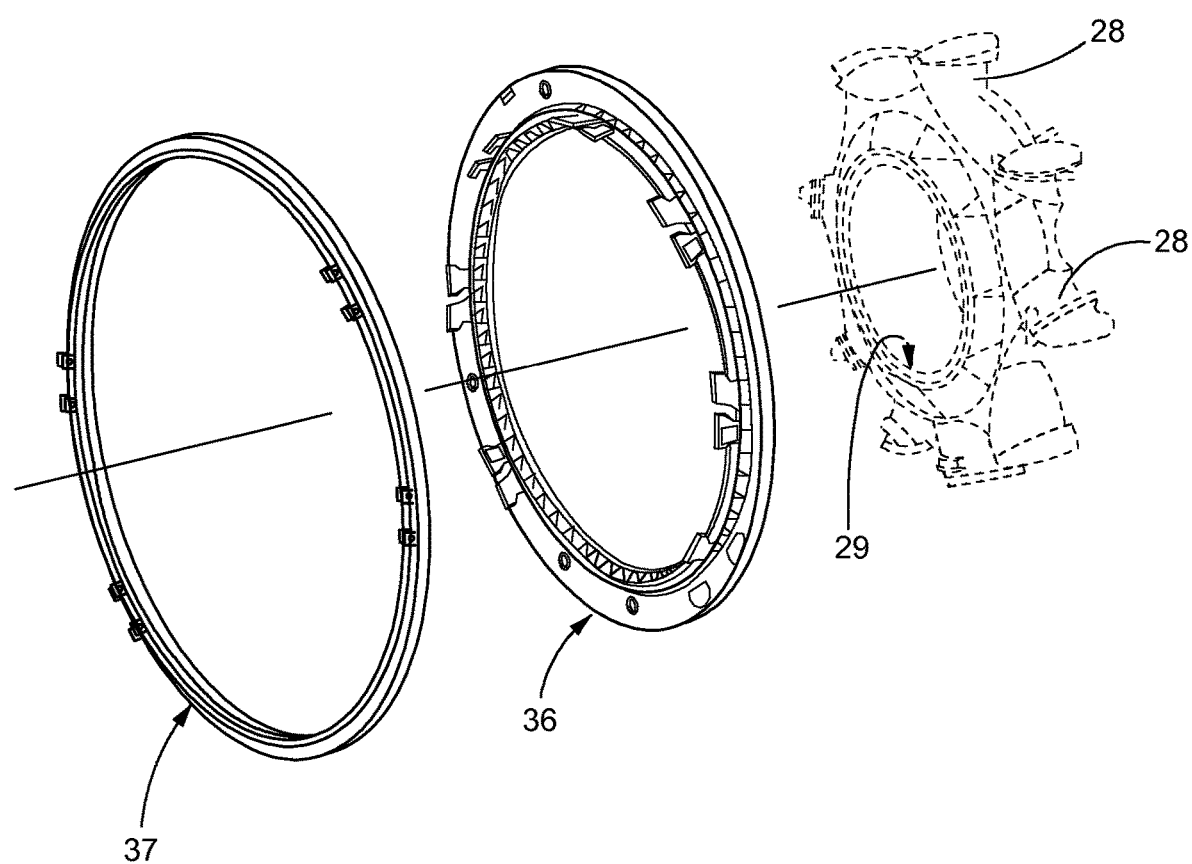
FIG. 4 is an exploded view of a stationary segment, bleed valve duct and inner case which may be coupled to the fan exit case disclosed in FIGS. 2 and 3.
Figure 7:
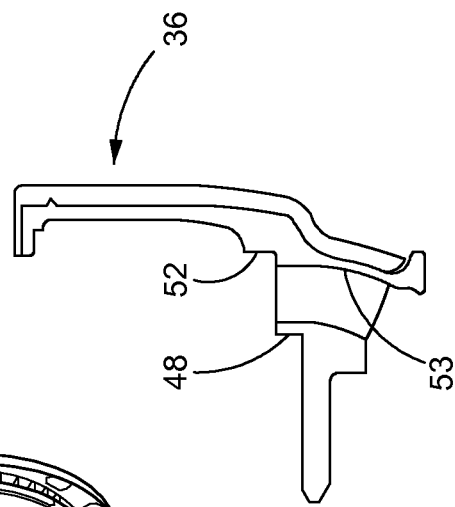
FIG. 7 is a perspective view of the bleed valve duct shown in FIG. 4.

Turning to FIG. 2, the fan exit case assembly 25 includes an outer case 26 coupled to a plurality of inwardly directed struts 27 which are connected to the spokes 28 of the intermediate case 29 shown in FIG. 4. FIG. 3 is a partial cross sectional view of the fan exit case assembly 25 which illustrates a pair of circular flanges 31, 32 that form a slot 33 at the aft end 34 of the fan exit case 25. The slot 33 is used to couple the fan exit case 25 to the fan cowl doors 24. The slot 33 may therefore be subject to substantial wear during use of the engine 10. To impede such wear or to repair the slot 33 and flanges 31, 32 to their original dimensions after wear has taken place, at least the slot 33 may be coated with an improved wear resistant coating disclosed herein. Specifically, the slot 33 may be coated with a composite of aluminum oxide powder and PTFE or a blend of aluminum oxide powder and PTFE. It has been surprisingly found that a composite of aluminum oxide powder and PTFE or a blend aluminum oxide powder and PTFE can be used to replace a previously deposited wear resistant layer, such as AMS 2482, even if the previous layer has affected the dimensions of the slot 33 and flanges 31, 32.

Traditionally, when a protective layer has been worn through, the repair procedure would require some plating or welding to restore the original dimensions of the component being repaired. However, either a blend of aluminum oxide powder with PTFE or using a PTFE/aluminum oxide powder composite allows a replacement protective layer to be applied using a thermal spray coat process that provides a thicker protective layer (as opposed to a conventional anodizing process), thereby enabling the component to be restored to its original dimensions without resorting to plating or welding procedures. The slot 33, which engages the fan cowl doors 24 is an example of a part of a component that is subject to sliding contact wear and handing/assembly damage from a misalignment of the cowl doors missing the center of the slot 33 and grinding down the side of the slot or any foreign object being caught between the door and the slot applying a point load. This may result in chipping and spallation-type wear. Therefore, the slot 33 may be a good candidate for the application of a local patch of the PTFE/aluminum oxide powder blend or the PTFE/aluminum oxide powder composite.

Turning to FIGS. 4-8, a compressor bleed valve is another component subject to sliding contact wear. Specifically, turning to FIG. 4, a bleed valve duct 36 is shown that may be coupled to a stationary segment 37. The fan inner case 29 may be disposed within the bleed valve duct 36 and the stationary segment 37. The spokes 28 of the inner fan case 29 are coupled to the struts 27 of the fan exit case assembly 25.

Figure 8:
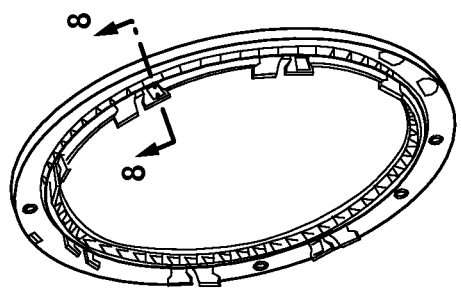
FIG. 8 is a sectional view taken substantially along line 8-8 of FIG. 7.
Figure 5:
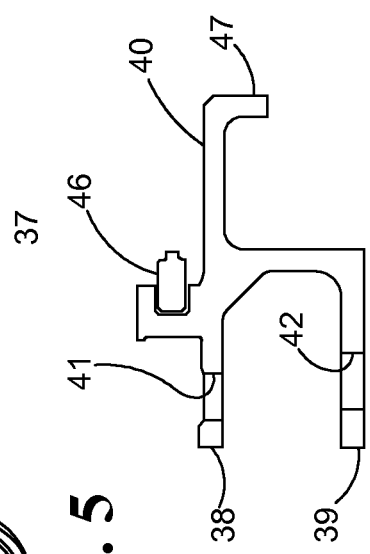
FIG. 5 is a perspective view of the stationary segment shown in FIG. 4.
Figure 6:
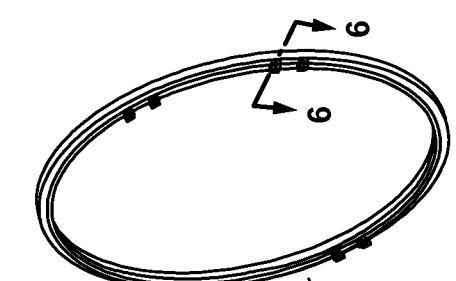
FIG. 6 is a sectional view taken substantially along line 6-6 of FIG. 5.

Turning to FIGS. 5-8, the stationary segment 37 has a cross section illustrated in FIG. 6. The stationary segment 37 may include six pairs of parallel tabs 38, 39. Each tab 38, 39 may include an opening 41, 42 respectively. A seal 46 engages part of the fan exit case assembly and the surface 47 disposed at an aft end of the rearwardly extending flange 40 engages the surface 48 of the bleed valve duct 36. Because of the sliding contact between the surfaces 47, 48, the surface 48 or the surface 47 may be coated with the disclosed aluminum oxide powder/PTFE composite or the disclosed aluminum oxide powder/PTFE blend. The surface 52 of the bleed valve duct 36 may also be coated with the disclosed aluminum oxide powder/PTFE composite or aluminum oxide powder/PTFE blend as well. FIG. 8 also illustrates a bleed passageway 53 through which low pressure air may pass before being directed outside of the nacelle 22. Ports permitting the low pressure air to exit the nacelle 22 may be placed near the fan exit case assembly and/or fan cowl doors as will be appreciated by those skilled in the art.

Figure 9:
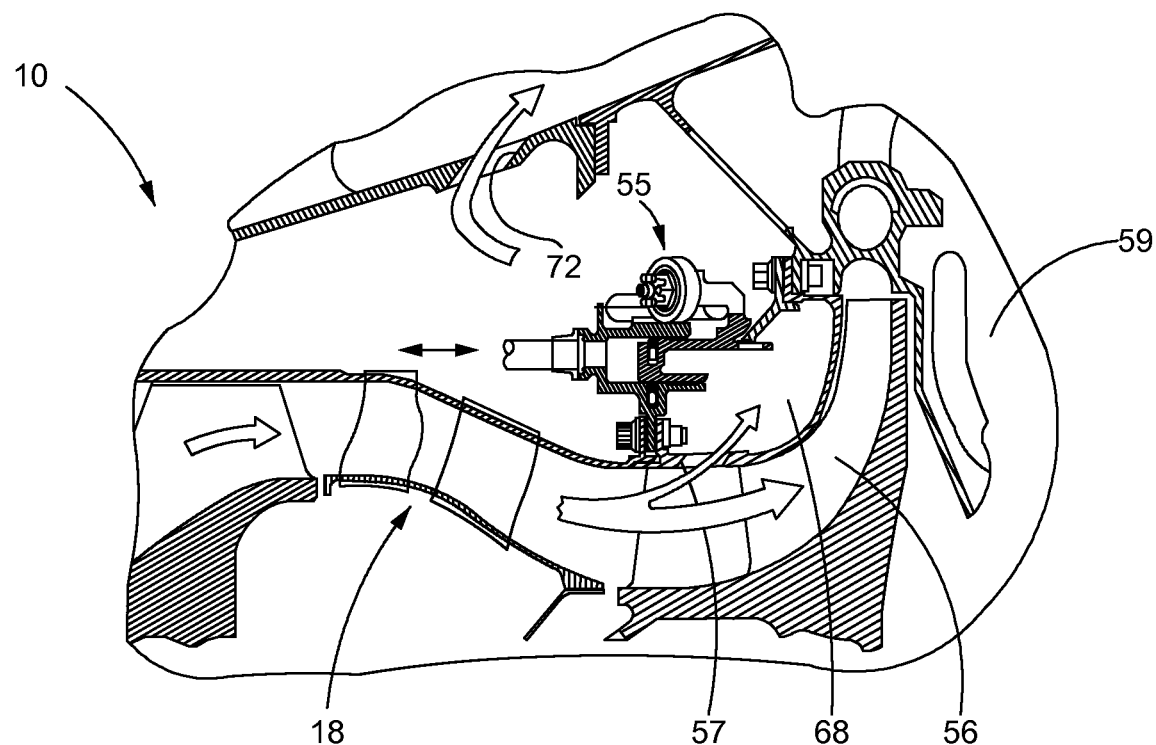
FIG. 9 is a partial sectional view of a compression section of a gas turbine engine featuring a bleed valve assembly.
Figure 10:
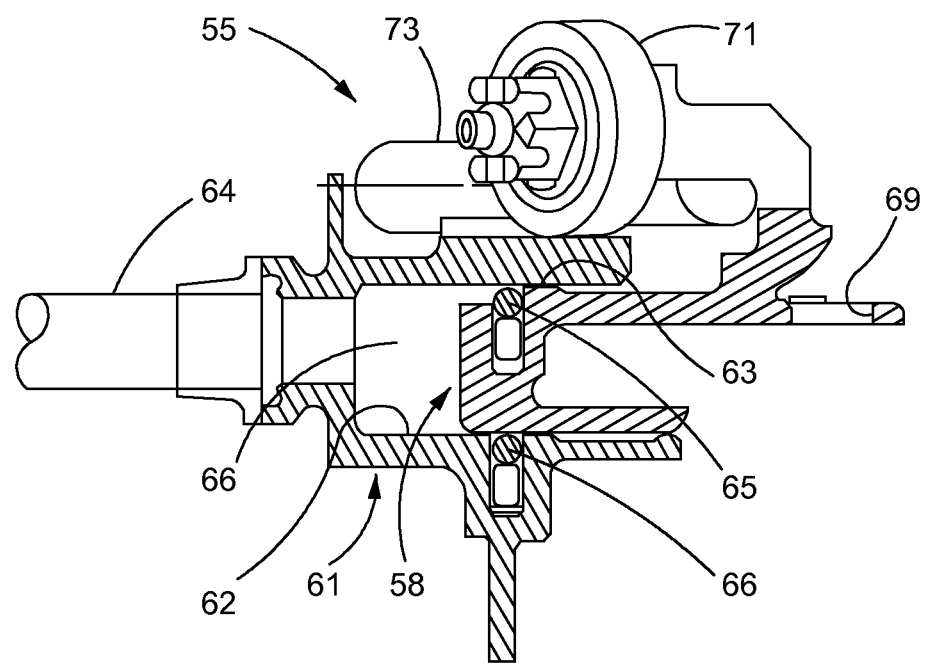
FIG. 10 is a partial sectional and perspective view of the bleed valve assembly shown in FIG. 9.

Turning to FIGS. 9-10, an HPC 18 is illustrated as well as a bleed valve assembly 55. In this case, the bleed valve assembly 55 directs high pressure air from the HPC 18 and the passageway 56 that leads to the combustor 59. A redirection port 57 directs air towards the bleed valve assembly 55. The bleed valve assembly 55 includes a piston 58 that is slidably received within a valve body 61. Because of the sliding contact between the inner surface 62 of the valve body 61 and the outer surface 63 of the piston 58, both of these surfaces 62, 63 may be coated with the disclosed aluminum oxide powder/PTFE composite or aluminum oxide powder/PTFE blend for added wear protection and/or repair of the valve body 61 and piston 58. The particular bleed valve assembly 55 disclosed in FIGS. 9 and 10 may be air actuated by supplying or withdrawing air from the tube 64. While the valve assembly 55 does include polymeric or rubber seals 65, 66, the surfaces 62, 63 are still prone to substantial wear and may benefit from the disclosed composite or blend coatings.

When air is supplied through the tube 64, the chamber 66 becomes pressurized thereby moving the piston 58 to the position shown in FIG. 10, or a closed position. When the supply of air through the tube 64 is shut off, pressure in the chamber 68 (FIG. 9) and the bias of the spring 73 move the position to the left in the orientation of FIGS. 9-10 thereby opening the valve and placing the port 69 below the guide bearings 71 which enables air to pass through the outlet port 72 and bypass the combustor. Springs 73 may also be employed to draw the piston 58 to the open position (not shown) thereby decreasing the size of the chamber 66. Thus, air pressure supplied through the tube 64 overcomes the bias of the spring 73 as well as pressure in the chamber 68 to move the piston 58 to the closed position shown in FIGS. 9-10.

The disclosed blends and composites may include from about 5 to about 30% by weight PTFE. Blends have distinct particles of each material. A PTFE particle has no aluminum oxide content and vice versa. A composite particle includes both materials in the same particle either as a fused, imbedded, or encapsulated form. There are several variations of thermal spraying, including plasma spraying, detonation spraying, wire arch spraying, flame spraying, high velocity oxy-fuel coating spraying (HVOF), warm spraying, and cold spraying. Flame spraying, plasma spraying and HVOF may prove to be the most effective thermal spray techniques but those skilled in the art may find one or more of the other types of thermal spraying to be applicable as well.

INDUSTRIAL APPLICABILITY

It has been surprisingly found that either a composite or a blend of aluminum oxide, one example of which is aluminum oxide powder, and PTFE provides a superior wear resistant coating for aluminum parts subject to sliding wear. In addition to aluminum oxide powder, other aluminum oxide materials are available and are apparent to those skilled in the art. The disclosed aluminum oxide powder/PTFE composites and blends have been shown over certain aluminum oxide sources such as AMS 2482, which is a PTFE modified anodize layer as well as an improvement over AMS 2468, which is an aluminum oxide layer.

Many aluminum oxide coatings can be applied substantially thicker (3-5 times thicker) using a thermal spray process than AMS 2468, which is applied using an anodizing process. AMS 2468 thickness growth during the anodizing process slows down as the coating gets thicker because the coating impedes the current/voltage and the bath reactants from reaching the aluminum surface. As a result, the thermal spray may be used to repair/restore substantially deeper wear.

The thicker coatings disclosed herein will have a longer wear life than an anodized layer of AMS 2468 thereby providing for longer intervals before the surface is worn back to the parent aluminum. The thicker coating will have a greater insulation capacity from heat generated at the rub/sliding contact surface. Since the aluminum may be more affected by thermal excursions, the coating may provide greater spallation resistance.

With regard to the AMS 2468 (anodized without PTFE), rubber seals that rub on an AMS 2468 surface will exhibit greater durability. This is why surfaces that rubber seals contact in sliding modes are frequently coated with PTFE or another dry film lubricant (DFL). As a DFL, PTFE is used typically from a solvent-based fluid or a sintered powder. The disclosed coating may also be considered a new DFL with good wear resistance due to the hardness of the aluminum oxide component.

The invention claimed is:

1. A method of applying a wear-resistant coating to at least one sliding contact wear surface, the method consisting of:
    providing at least one part having the at least one sliding contact wear surface, wherein the at least one sliding contact wear surface has a worn protective coating;
    thermal spray coating aluminum oxide and polytetrafluoroethylene (PTFE), on the sliding contact wear surface for added wear protection and/or repair of the sliding contact wear surface.

2. The method of claim 1 wherein the aluminum oxide is aluminum oxide powder.

3. The method of claim 1 wherein the aluminum oxide and PTFE are a composite feedstock of aluminum oxide powder and PTFE.

4. The method of claim 1 wherein the aluminum oxide and PTFE is a blend of aluminum oxide powder and PTFE powder.

5. The method of claim 1 wherein the at least one coated sliding contact wear surface makes sliding contact with a stationary rubber seal.

6. The method of claim 1 wherein the at least one coated sliding contact wear surface remains stationary and makes sliding contact with a sliding rubber seal.

7. The method of claim 1 wherein the at least one sliding contact wear surface forms part of a bleed valve that is coupled to a fan exit case assembly of a gas turbine engine.

8. The method of claim 7 wherein the bleed valve includes a stationary segment coupled to an aft end of the fan exit case assembly and a partially rotational bleed valve duct coupled to the stationary segment.

9. The method of claim 8 wherein the bleed valve duct is rotatable with respect to the stationary segment between an open position providing communication between an inside of the fan exit case assembly and an outside of the fan exit case assembly.

10. The method of claim 8 wherein the stationary segment includes a rearwardly extending flange with a stationary surface disposed at an aft end thereof, the bleed valve duct includes a sliding surface for engaging the stationary surface of the flange of the stationary segment, and at least one of the stationary surface of the stationary segment and the sliding surface of the bleed valve duct are coated with the thermal spray coating.

11. The method of claim 10 wherein both the sliding surface and stationary surface are coated with the thermal spray coating.

12. The method of claim 1 wherein the at least one coated sliding contact wear surface includes slots disposed at an aft end of a fan exit case assembly of a gas turbine engine, and at least one of the slots is coated and engage a rubber seal.

13. A valve for a gas turbine engine, comprising:
a stationary segment coupled to a partially rotational bleed valve duct,
the bleed valve duct being rational between open and closed positions,
the stationary segment including a rearwardly extending flange with a stationary surface disposed at an aft end thereof, the bleed valve duct including a sliding surface for engaging the stationary surface of the flange of the stationary segment, wherein at least one of the stationary surface of the stationary segment and the sliding surface of the sliding segment have been repaired with a material consisting of a thermally sprayed coating of aluminum oxide and PTFE.

14. The compressor bleed valve of claim 13 wherein both the sliding surface and stationary surface are coated with the thermally sprayed coating.

15. The compressor bleed valve of claim 13 wherein the aluminum oxide is an aluminum oxide powder.

16. The compressor bleed valve of claim 13 wherein at least part of the least one of the stationary and sliding surfaces that is coated engages a rubber seal.

17. A compressor bleed valve for a gas turbine engine, the compressor bleed valve comprising:
a static valve body, the static valve body including an inner surface that slidably engages a piston;
at least one of the piston and inner surface of the valve body being coated repaired with a material consisting of a thermally sprayed coating of aluminum oxide and PTFE.

18. The compressor bleed valve of claim 17 where in the aluminum oxide is an aluminum oxide powder.

19. The compressor bleed valve of claim 16 wherein the piston includes a rubber seal and the inner surface of the valve body is coated with the thermally sprayed coating.

* * * * *